US 009536001B2

(12) United States Patent
Ramsey et al.

(10) Patent No.: US 9,536,001 B2
(45) Date of Patent: Jan. 3, 2017

(54) INTENT-BASED PRESENTATION OF SEARCH RESULTS

(71) Applicant: Microsoft Corporation, Redmond, WA (US)

(72) Inventors: William Ramsey, Redmond, WA (US); Nitin Agrawal, Redmond, WA (US); Simant Dube, Mountain View, CA (US); Antonio Gulli, Pisa (IT); Binit Kumar Jha, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 13/675,300

(22) Filed: Nov. 13, 2012

(65) Prior Publication Data
US 2014/0136536 A1 May 15, 2014

(51) Int. Cl.
*G06F 17/30* (2006.01)
(52) U.S. Cl.
CPC .............................. *G06F 17/30867* (2013.01)
(58) Field of Classification Search
None
See application file for complete search history.

(56) References Cited

U.S. PATENT DOCUMENTS 7,630,972 B2 * 12/2009 Ott et al.
8,484,208 B1 * 7/2013 Raghavan ......... G06F 17/30941
707/728
2006/0204142 A1 * 9/2006 West ................. G06F 17/30864
382/305
2009/0012841 A1 * 1/2009 Saft et al. ........................ 705/10
2010/0185644 A1 7/2010 Gutt et al.
2010/0299343 A1 11/2010 Ahari et al.
2011/0072033 A1 3/2011 White et al.
2011/0320440 A1 12/2011 McDonald et al.
2012/0310926 A1 * 12/2012 Gannu et al. ................. 707/723

OTHER PUBLICATIONS

"International Search Report & Written Opinion for PCT Patent Application No. PCT/US2013/069709", Mailed Date: Jan. 15, 2014, Filed Date: Nov. 12, 2013, 11 Pages.

(Continued)

*Primary Examiner* — Jay Morrison
(74) *Attorney, Agent, or Firm* — Dave Ream; Tom Wong; Micky Minhas

(57) ABSTRACT

Various embodiments of the disclosed subject matter include computer-implemented methods, computer-readable media, and computer systems configured to respond to a search query from a computer user. In response to receiving a search query from the computer user, search results are obtained. A plurality of user intents are identified according to the obtained search results. The obtained search results are then grouped according to the subject matter of the search results, where each group corresponds to one of the plurality of user intents. A first user intent (with the corresponding group of search results) is selected. A search results page is generated from the search results of the group the search results corresponding to the selected first user intent and the generated search results page is returned to the computer user in response to the search query.

19 Claims, 6 Drawing Sheets

(56) References Cited

OTHER PUBLICATIONS

Zeng, et al., "Learning to Cluster Web Search Results", In Proceedings of the 27th Annual International ACM SIGIR Conference on Research and Development in Information Retrieval, Jul. 25, 2004, pp. 210-217.

Ma, et al., "New Assessment Criteria for Query Suggestion", Retrieved at <<http://datasearch.ruc.edu.cn/~zhongruimai/doc/sigir2012.pdf>>, SIGIR'12, Aug. 12, 2012, pp. 2.

"Twitter beefs up search function", Retrieved at <<http://phys.org/news/2012-07-twitter-beefs-function.html>>, Jul. 6, 2012, pp. 9.

Slawski, Bill, "Predictive Search Query Suggestions", Retrieved at <<http://www.seobythesea.com/2009/05/predictive-search-query-suggestions/>>, May 8, 2009, pp. 15.

Broccolo, et al., "Generating suggestions for queries in the long tail with an inverted index", Retrieved at <<http://miles.isti.cnr.it/~nardini/wp-content/uploads/2011/09/ipm-shortcuts.pdf>>, In Inf. Process. Manage., vol. 48, Nr. 2 (2012), Retrieved Date: Aug. 28, 2012, pp. 14.

Preston, Adam, "Create Query Suggestions and Related Searches in SharePoint Server 2010", Retrieved at <<http://www.tcscblog.com/2011/05/11/create-query-suggestions-and-related-searches-in-sharepoint-server-2010/>>, May 11, 2011, pp. 3.

Song, et al., "Post-Ranking Query Suggestion by Diversifying Search Results", Retrieved at <<http://research.microsoft.com/pubs/147464/sigirfp546-song.pdf>>, SIGIR'11, Jul. 24, 2011, pp. 10.

Kato, et al., "Structured Query Suggestion for Specialization and Parallel Movement: Effect on Search Behaviors", Retrieved at <<http://www2012.wwwconference.org/proceedings/proceedings/p389.pdf>>, WWW 2012, Apr. 16, 2012, pp. 10.

"International Preliminary Report on Patentability Issued in PCT Application No. PCT/US2013/069709", Mailed Date: May 28, 2015, 8 Pages.

Office Action Issued in Mexican Patent Application No. MX/a/2015/006043, Mailed Date: Aug. 31, 2016, 3 Pages.

\* cited by examiner

FIG. 2

Jaguars, Jaguar Pictures, Jaguar Facts - National Geographic
animals.nationalgeographic.com/animals/mammals/jaguar
Fast Facts Type: Mammal Diet: Carnivore Average life span in the wild: 12 to ... Jaguars
also eat larger animals such as deer, peccaries, capybaras, and tapirs.

How fast can a jaguar run? | Answerbag - Answerbag.com | Ask ...
www.answerbag.com/q_view/89613
Science / Biology / Animals & Wildlife / Mammals / Wild Cats / Jaguars ... Why can jaguars
run fast? How fast does the 2005 Jaguar XK8 Coupe go in a quarter mile?

Images of FAST JAGUARs animals
bing.com/images

ANIMAL BYTES - Jaguar
www.seaworld.org/.../chordata/craniata/mammalia/carnivora/jaguar.htm
ANIMAL BYTES - Jaguar...Find quick information and fun facts about animals. ... FAST FACTS Jaguar Animal Cat - Essortment Articles: Free Online Articles on ...
www.essortment.com/jaguar-animal-cat-23473.html
Pets & Animals; Jaguar Animal Cat ... In fact, they swim so fast that they make bow waves. The
jaguar will then emerge from the river ...

Jaguar - Wikipedia, the free encyclopedia
en.wikipedia.org/wiki/Jaguar_(animal)
Etymology • Taxonomy and evolution • Biology and behavior • Ecology
Hunting of jaguars is restricted to "problem animals" in Brazil, Costa Rica, Guatemala, Mexico
and Peru, while trophy hunting is still permitted in Bolivia.

How fast can a Jaguar run? | Answerbag | Ask ...
www.answerbag.com/q_view/89613
How fast can a jaguar run? It has been clocked at 103 km/h (64 mph) over very short
distances. ... Science / Biology / Animals & Wildlife / Mammals / Wild Cats / Jaguars Of Cats: Jaguar Facts
www.ofcats.com/2008/07/jaguar-facts.html
How fast can a jaguar run? It has been clocked at 103 km/h (64 mph) over very short
distances. ... Science / Biology / Animals & Wildlife / Mammals / Wild Cats / Jaguars Official Jaguar Site – Build & Configure Your Next Jaguar
www.JaguarUSA.com
Locate a Jaguar Dealer Now How fast does a Jaguar car go? | The Q&A Wiki
wiki.answers.com/Q/How_fast_does_a_jaguar_car_go
Depends on what Jaguar model, the fastest called XJ220 once held the
speed record at 350 kmph (217mph)

*FIG. 4*

INTENT-BASED PRESENTATION OF SEARCH RESULTS

BACKGROUND

Quite often an online search services provider (referred to as a search engine) will receive a search query from a computer user where the intent of the search query is ambiguous. For example, the search query "fast jaguar" may refer to a brand of car (Jaguar), a feline native to the Americas, or even to a speedy American football player. Of course, the computer user that submits the search query will have a specific topic or intent in mind. However, since the search engine cannot know the computer user's intent of an ambiguous search query simply from the search query itself, the search engine will retrieve search results that are directed to each of the potential topics. As those skilled in the art will appreciate, the retrieved search results are scored (based on a variety of factors) and one or more search results pages are generated based on the scored search results. Search results having the highest scores are placed in the first search results page. Not surprisingly, for a search query with an ambiguous intent the search results included on any given search results page are mixed, i.e., search results covering multiple potential topics/intents.

SUMMARY

According to embodiments of the disclosed subject matter, a computer-implemented method configured to respond to a search query from a computer user is presented. In response to receiving a search query from the computer user, search results are obtained. A plurality of user intents are identified according to the obtained search results. The obtained search results are then grouped according to the subject matter of the search results, where each group corresponds to one of the plurality of user intents. A first user intent (with the corresponding group of search results) is selected. A search results page is generated from the search results of the group the search results corresponding to the selected first user intent and the generated search results page is returned to the computer user in response to the search query.

According to further embodiments of the disclosed subject matter, a computer-readable medium bearing computer-executable instructions is presented. The instructions stored by the computer-readable medium, when executed a computing system comprising at least a processor, carry out a method for responding to a search query from a user. The method includes obtaining search results upon receiving a search query from a computer user. The obtained search results are grouped according to the subject matter of the search results, where each group corresponds to one of the plurality of user intents. A first user intent (with the corresponding group of search results) is selected. A search results page is generated from the search results of the group the search results corresponding to the selected first user intent and the generated search results page is returned to the computer user in response to the search query.

According to still further embodiments and aspects of the disclosed subject matter, a computer system for providing online search services is presented. The computer system includes a processor and a memory, wherein the processor executes instructions stored in the memory as part of or in conjunction with additional components to respond to a search query received from a computer user. The additional components comprise a search results retrieval component that obtains search results responsive to the search query. Also included in the computer system is an intent identification component. The intent identification component identifies a plurality of user intents from the search results obtained by the search results retrieval component. A search results grouping component that groups the search results obtained by obtained by the search results retrieval component into a plurality of groups of search results. An intent selection component selects a first user intent from the plurality of user intents as the primary intent of the search query, and a search results page generator generates a search results page from the group of search results corresponding to the selected first user intent. The search results page is returned to the user via a network communication component.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein:

FIG. 2 is a pictorial diagram illustrating typical search results responsive to an intent-ambiguous search query;

FIG. 4 is a pictorial diagram illustrating search results of an illustrative search results page, unconstrained by the limitations of a browser view, in which a few search results of a second group of search results are incorporated into the search results of a first group of search results;

DETAILED DESCRIPTION

Figure 1:
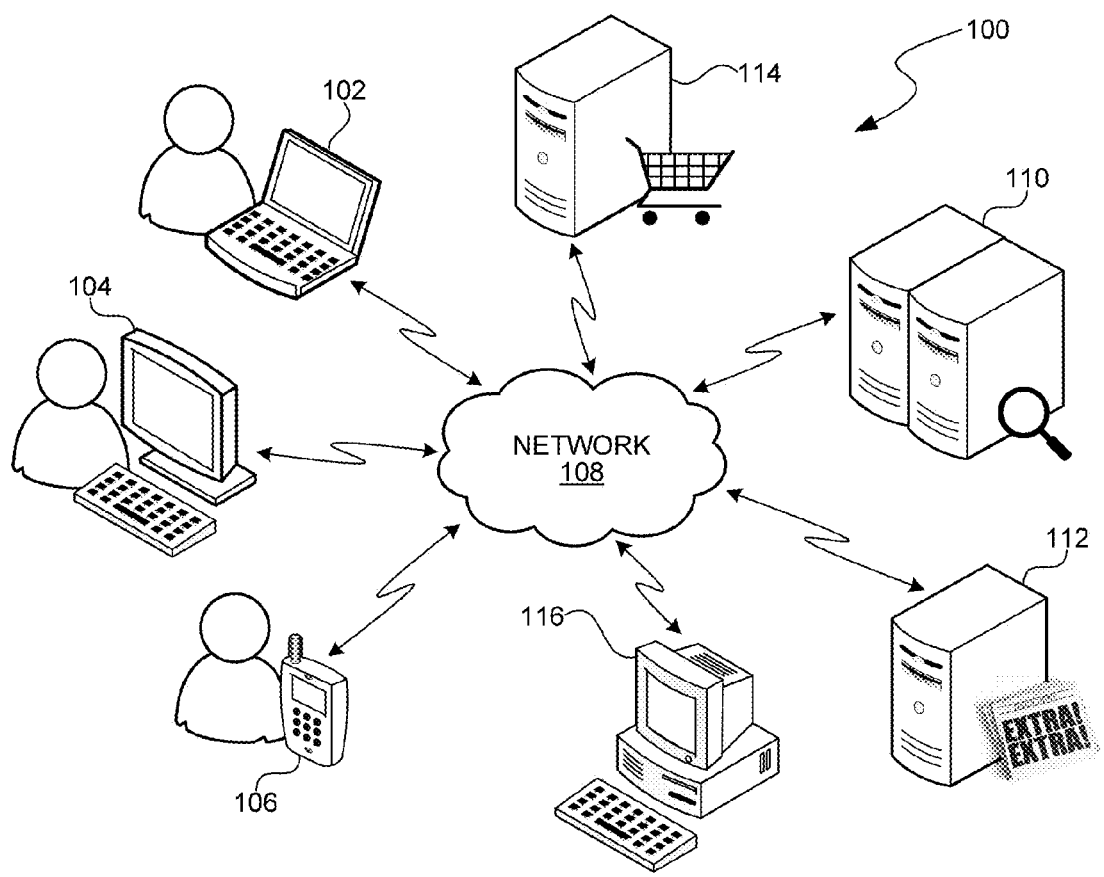
FIG. 1 is diagram of an illustrative network environment suitably configured to provide intent-based presentations of search results in response to search queries received from computer users.

Turning to FIG. 1, this figure shows an illustrative diagram of an exemplary networked environment 100 suitably configured to provide intent-based presentations of search results in response to search queries received from computer users. The illustrative environment 100 includes one or more user computers, such as user computers 102-106, connected to a network 108, such as the Internet, a wide area network or WAN, and the like. Also connected to the network 108 is a search engine 110 configured to provide intent-based presentations of search results in response to search queries received from computer users, as will be described in greater detail below.

Those skilled in the art will appreciate that, generally speaking, a search engine 110 corresponds to an online service hosted on one or more computers, or computing systems, located and/or distributed throughout the network 108. The search engine 110 receives and responds to search queries submitted over the network 108 from various computer users, such as the computer users that may be connected to user computers 102-106. In particular, responsive to receiving a search query from a computer user, the search engine 110 obtains search results information related and/or relevant to the received search query (as defined by the terms of search query.) The search results information includes search results, i.e., references (typically in the form of hyperlinks) to relevant and/or related content available from various network locations, including content-hosting sites, such as content-hosting sites 112-116, located throughout the network 108.

As those skilled in the art will appreciate, content-hosting sites 112-116 host or store content that is available and/or accessible to computer users (via user computers) over the network 108. Through the user of processes that crawl the network scanning for content, the search engine 110 will be aware of at least some of the content hosted on the many content-hosting sites 112-116 located throughout the network 108. Once content is located, the search engine 110 will store information regarding the hosted content in a content store (e.g., content store 616 of FIG. 6). The search engine 110 draws from the content store when obtaining search results information in response to receiving a search query from a computer user.

The search results information obtained by the search engine 110 in response to a search query may further include (by illustration and not limitation) related and/or recommended alternative search queries, data and facts regarding the subject matter of the search query, images pertaining to the subject matter of the search query, products and/or services related/relevant to the search query, advertisements, and the like. As those skilled in the art will appreciate, quite frequently the search services offered by a search engine 110 will appear as a free service, i.e., a computer user is not charged a pecuniary amount for the search results provided in response to a search query (also synonymously referred to as a search request). Instead, the search results (generated in one or more a search results pages) are combined with advertisements such that the search service is "ad supported," i.e., financed by advertisements paid for by advertisers.

While the goal of a search engine 110 is to provide a computer user who submits a search query with exactly the information that the computer user is seeking, the reality is that the computer user (via a search query) often fails to identify what exactly is sought (i.e., the user's intent). Instead, a search query can be interpreted as having any one of several user intents. Correspondingly, the search engine 110 retrieves search results that satisfy all of the various potential user intents. For example, FIG. 2 is a pictorial diagram illustrating a browser view 200 of typical search results 202 responsive to an intent-ambiguous search query 204 which, for purposes of illustration, is "fast jaguar." As can be seen, since the query 204, "fast jaguar," potentially encompasses several user intents (a car, a feline, etc.), the typical search results 202 include specific search results directed to all of the intents: search results 206 and 212 referencing a brand of automobile and search results 208-210 referencing an American feline. To the computer user, who likely had a specific query intent in mind when submitting the search query, the search results 202 confirm that the user's query corresponded to multiple intents and that a more specific search query may be needed.

Figure 3:
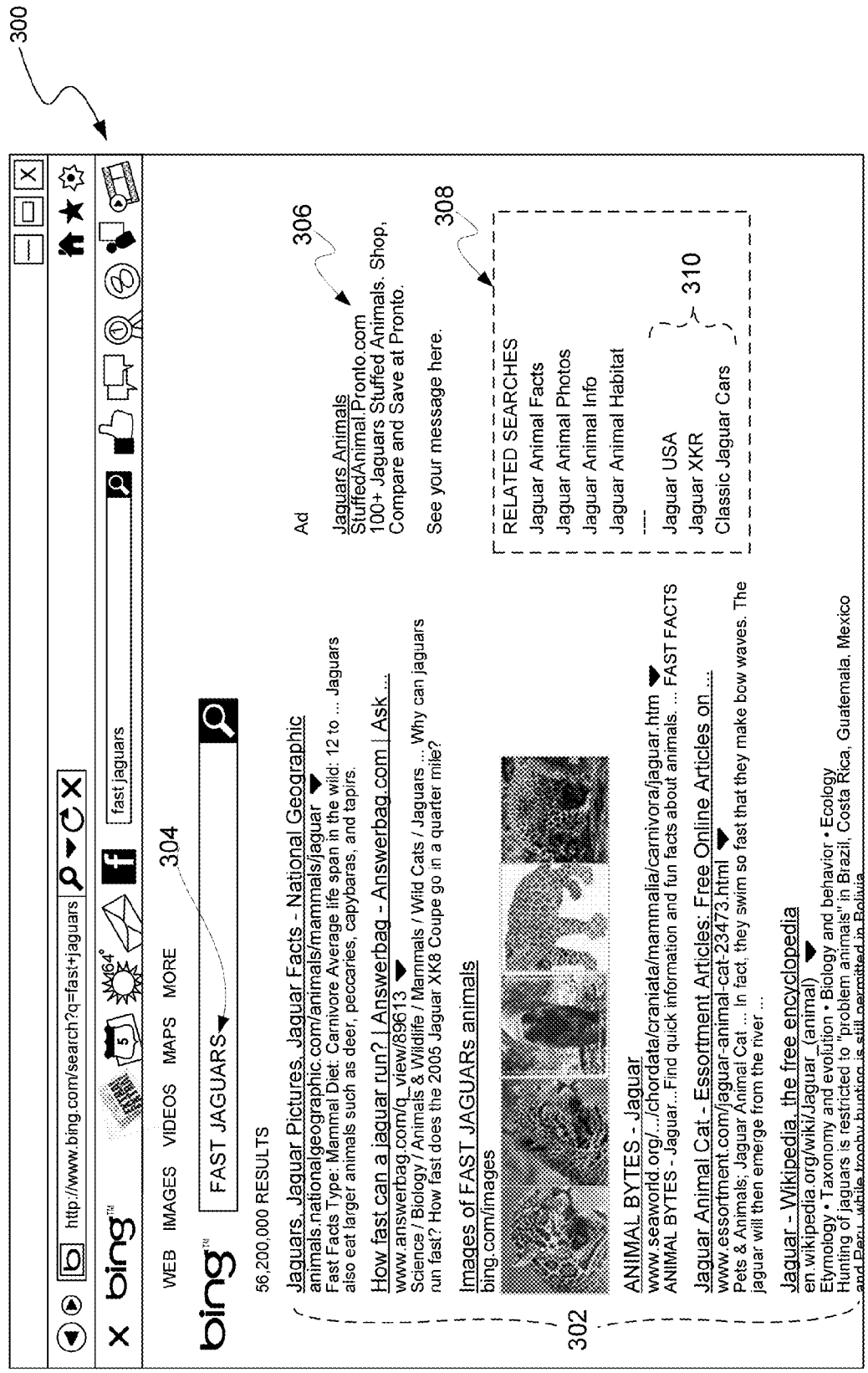
FIG. 3 is a pictorial diagram illustrating a browser view of an intent-based grouping of search results responsive to an intent-ambiguous search query.

According to aspects of the disclosed subject matter, instead of providing mixed search results without regard to any user intent, after obtaining search results responsive to a search query, if the search query corresponds to multiple intents the search engine 110 groups the search results according to intents and presents the search results (by way of search results pages) according to the groups. For example, FIG. 3 is a pictorial diagram illustrating a browser view 302 of an intent-based grouping of search results 302 responsive to an intent-ambiguous search query 304, "fast jaguar." In this illustrative example, as the search query 304, "fast jaguar," corresponds to multiple user intents, the search engine 110 has grouped the search results it retrieved from its content store, selected a first group of results (selecting to show the group of search results directed to the American feline) to present to the computer user, and generated a search results page shown in the browser view 300.

In addition to grouping search results and presenting the grouped search results on a search results page, the search engine 110 can further homogenize the content of the search results page by including advertisements that correspond to the same intent as the primary/principal group of search results displayed on the search results page. For example, the advertisement 306 included in the search results page shown by the browser view 300 corresponds to (or is aligned with) the jaguars (American felines) that have been selected as the principle group of search results displayed on this search results page.

In regard to selecting a first (principle or primary) user intent and displaying search results from that group, the search engine 110 can be configured to rely on any number of factors, criteria, and/or heuristics. As those skilled in the art will appreciate, when a search engine obtains search results responsive to a search query, each search result has a score that indicates the relevance or importance of the search result to the search query, reputation and/or popularity of the search result, as well as information corresponding to the user (including implicit and explicit profile information, user context, and preferences.) Spelling corrections, too, may be a source of user intent. For example, a search query "born ultimatum" may yield results that less popular and/or unimportant (and, correspondingly would not be considered as a principal/primary user intent.) However, through spelling correction (even though the query terms may be spelled correctly), making the search query "Bourne Ultimatum" would likely substantially change the user intent of the search query and provide search results with high scores such that the group would be considered as a primary search group. Thus, in at least one embodiment, the search engine identifies the various groups corresponding to the various potential user intents, identifies the group that has the highest scores, and selects the best search results from that highest-scoring group in generating a particular search results page.

Those skilled in the art will appreciate position in the search results pages is important, as well as position of search results within a specific search results page. As has already been mentioned above, it is very important for a search engine 110 to provide a computer user with the answers that the computer user is seeking just as quickly as possible. Computer users often disengage with a search engine 110 if the computer user is unable to locate the sought-for information quickly. The top few, initially visible search results (i.e., those results on the search results page that are initially visible, also referred to as being above the fold) are far more likely to be viewed and/or selected that those results on the first search results page that are not initially displayed (i.e., those results that are below the fold.) Further still, search results on the first search results page (in response to a search query) are far more likely to be viewed and selected than search results on subsequent pages. With this in mind, the search engine 110 should not only select the best group but also the best search results from that group when generating the search results pages, especially the initial search results page.

While the search engine 110 will try to make the best choice as to which intent will be selected as the initial, primary intent of a search query and, correspondingly, which group of search results will be initially, primarily displayed on the first search results page, the search engine may choose the wrong intent. Thus, while search results from the initial, primary group of search results will be displayed on the first search results page, according to aspects of the disclosed subject matter, a small number of search results from a second group (not the initial group) of search results may be incorporated in less prominent positions on a search results page, such as the last few search results below the fold on a search results page. For example, FIG. 4 is a pictorial diagram illustrating an illustrative search results page 400 unconstrained by the limitations of a browser view, in which a few search results 404 of a second group of search results are incorporated into the search results page with search results 402 of a first group of search results. As shown in this example, the first group of search results 402 are directed to the American feline, and the last two search results of this search results page 400 correspond to (presumably) highly relevant search results 404 from a second group of search results (corresponding to a second intent.) According to non-limiting aspects of the disclosed subject matter, one to three important and/or high-scoring search results 404 from a second group of search results are displayed in a less prominent position on the search results page 400 with search results 402 of a first group of search results.

Also indicated in FIG. 4 is an indication 406 as to the fold of the search results page 400, i.e., the location on the search results page above which the results are initially visible and below which the search results are not initially visible. Of course, the actual location of a "fold" is dependent on the particular display parameters of a browser view. Moreover, a "fold" is not a displayed feature and is included in the search results page 400 for illustration purposes only.

In addition to including a few search results 404 from a second group of search results on a search results page, according to embodiments of the disclosed subject matter the search engine 110 may also include one or more related search links to target a second, unselected group of search results 404. Turning again to FIG. 3, the search results page of the browser view 300 includes a related searches section 308 that includes related searches 310 which, if selected, will cause the browser to present search results specific to the selected related search. According to aspects of the disclosed subject matter, the related searches 310 are intent-specific searches targeting one or more of the unselected (and therefore, un-displayed) potential user intents of the search query. By including related searches that target search results of user intents that are not currently displayed (primarily displayed) the search engine 110 can provide the computer user with a quick link to a topic that is the intent of the computer user.

While not shown, according to embodiments of the disclosed subject matter, once the results of the first selected group of search results have been incorporated into one or more search results pages, then the second group of search results (corresponding to a second computer user intent) may be incorporated into subsequent search results pages. This pattern may continue through any number of groups of search results depending on the number of likely intents of a given search query. Further, according to alternative aspects of the disclosed subject matter, groups of search results are aligned with search results pages such that each search results page is generally targeted to a single intent (with the exception that there may be a few search results corresponding to another query intent placed in less prominent positions as discussed above.) According to alternative embodiments of the disclosed subject matter, each set of search results may be presented on a search results page as a tabbed view of search results (not shown.)

Figure 5:
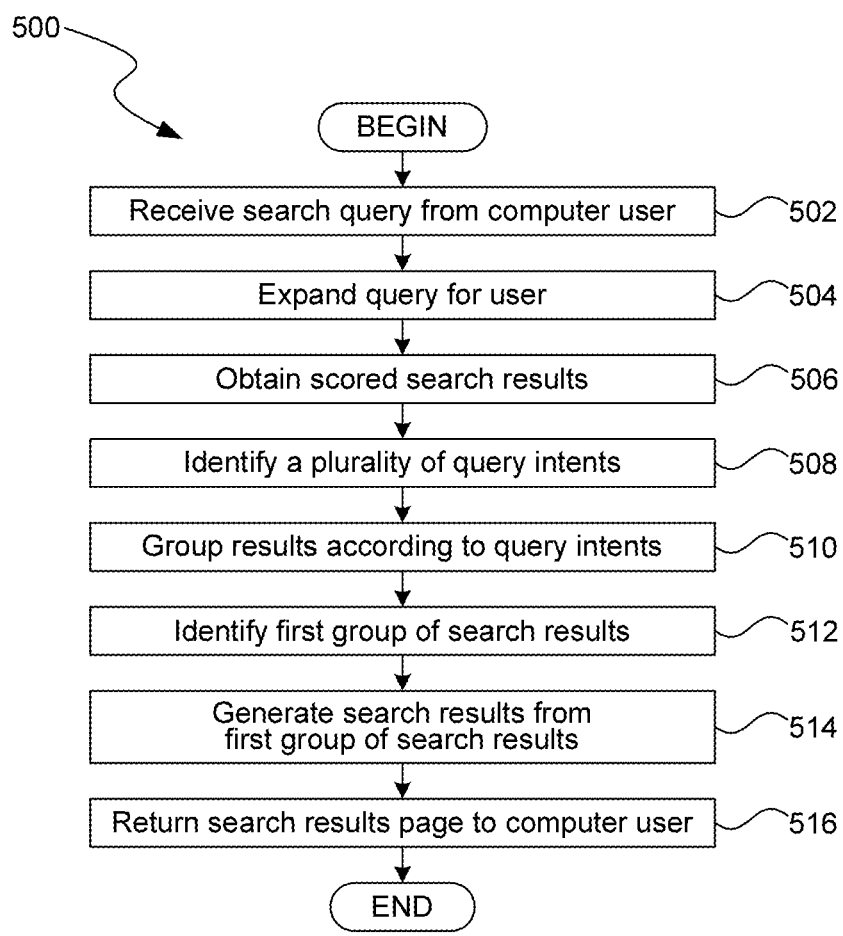
FIG. 5 is a flow diagram illustrating an exemplary routine for responding to an intent-ambiguous search query according to aspects of the disclosed subject matter.

FIG. 5 is a flow diagram illustrating an exemplary routine 500 for responding to an intent-ambiguous search query according to aspects of the disclosed subject matter. Beginning at block 502, the search engine 110 receives a search query from a computer user operating a user computer over the network 108. At block 504, the search query is expanded for the computer user. As those skilled in the art will appreciate, search engines typically expand a search query for the computer user as a technique for obtaining a broader spectrum of search results for the computer user's search query. By obtaining a broader spectrum of search results, a search engine 110 in Hansen is the likelihood of obtaining this specific information that the computer user is seeking through the search query.

At block 506, the search engine 110 obtains search results for the expanded search query. As previously mentioned, each of the search results obtained in response to a search query (including an expanded search query) is associated a score. This score indicates the relevance/importance of the search result to the search query (expanded search query). At block 508, the search engine 110 identifies a plurality of intents from the obtained search results. At block 510, the search engine 110 groups the obtained search results according to the intent of the result, i.e., matching a search result to one of the identified intents.

After having grouped the search results according to the intents, at block 512, the search engine identifies the first selected group of search results. As discussed above, this first group of search results is selected according to its importance/prominence to the search query. In at least one embodiment, the selection is based according to the scores of the search results in the various search results groups.

At block 514, the search engine 110 generates a first search results page based on the search results of the first selected search results group. As mentioned above, this first search results page may include a small number of search results from a second group of search results and or related searches corresponding to one or more groups of search results that were not initially selected/displayed. At block 516, the search engine 110 returns the first generated search results page to the computer user in response to receiving the search query. Thereafter, routine 500 terminates.

Regarding routine 500 of FIG. 5, it should be appreciated that while this routine is expressed with discrete steps in responding to a computer user's search query, these steps should be viewed as being logical in nature and may or may not correspond to any actual and/or discrete steps. Nor should the order that these steps are presented in the illustrative routine be construed as the only order in which the steps may be carried out. Further, those skilled in the art will appreciate that logical steps may be combined together or be comprised of multiple steps. Further still, logical steps may be carried out in parallel or in series.

While novel aspects of the disclosed subject matter are expressed in routines and/or methods, these aspects may also be embodied in computer-readable media. As those skilled in the art will appreciate, computer-readable media can host computer-executable instructions for later retrieval and execution. When executed on a computing device, the computer-executable instructions stored on one or more computer-readable storage devices carry out various steps or methods, including those steps, methods, and routines described above. Examples of computer-readable media include, but are not limited to: optical storage media such as digital video discs (DVDs) and compact discs (CDs); magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this document, however, computer-readable media expressly excludes carrier waves and propagated signals.

Figure 6:
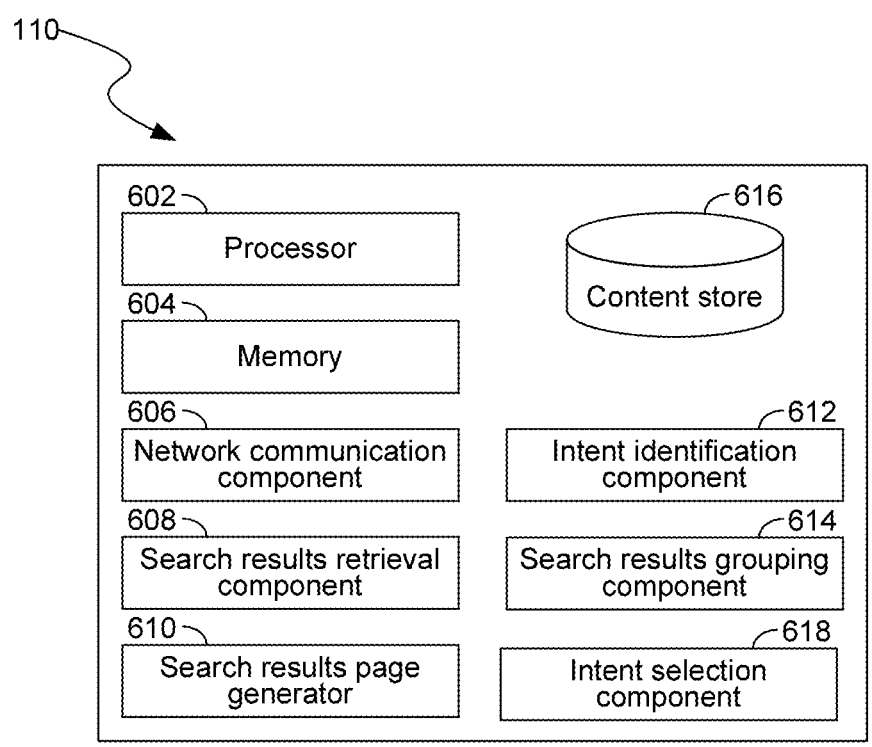
FIG. 6 is a block diagram illustrating exemplary components of a search engine configured to respond to an intent-ambiguous search query according to aspects of the disclosed subject matter.

Turning now to FIG. 6, FIG. 6 is a block diagram illustrating exemplary components of a search engine 110 configured to respond to an intent-ambiguous search query from a computer user according to aspects of the disclosed subject matter. As shown in FIG. 6, the search engine 110 includes a processor 602 and a memory 604. As those skilled in the art will readily appreciate, the processor 602 executes instructions retrieved from the memory 604 in carrying out various aspects of the search engine service including, but not limited to, responding to search queries from computer users.

The search engine 110 also includes a network communications component 606 through which the search engine sends and receives communications over the network 108. For example, it is through the communication component 606 that the search engine 110 receives search queries from computer users and response to the search query with one or more generated search results pages for presentation to the computer users.

The search engine 110 further includes a search results retrieval component 608 and a search results page generator 610. Regarding the search results retrieval component 608, this logical component is responsible for retrieving, or obtaining, search results information (including search results) relevant to a computer user's search query from a content store 616 associated with the search engine 110. The search results page generator 610 generates one or more search results pages from the search results obtained by the search results retrieval component 608 as discussed above.

As illustrated in FIG. 6, the search engine 110 also includes an intent identification component 612. The intent identification component is responsible for examining the search results obtained in response to an expanded search query and identifying the various potential computer user intents associated with an intent-ambiguous search query. The search engine 110 also includes a search results grouping component 614. The search results grouping component 614 groups the obtained search results into groups corresponding to the various identified user intents identified by the intent identification component 612. Still further, the search engine 110 includes an intent selection component 618 that orders and/or selects the group of search results having the highest scoring search results for inclusion in the generated search results page. According to alternative or additional aspects of the disclosed subject matter, the intent selection component may order and select groups of search results according to that which the search engine deems most likely be actual user intent of the computer user in submitting the search query.

Further, while the intent identification component 612, the search results grouping component 614, and the intent selection component 618 are identified as separate components, these components should be viewed as logical components and, according to various embodiments, may be included as a single component of a suitably configured search engine 110. Indeed, many (if not all) of the components of the search engine 110 should be viewed as logical components for carrying out various functions of a suitably configured search engine 110 in responding to a search query from a computer user as described above. These logical components may or may not correspond directly to actual components. Moreover, in an actual embodiment, these components may be combined together or broke up across multiple actual components. Further still, these components (both logical and actual) may be distributed across one or more cooperative computer systems.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for responding to a search query from a computer user, the method comprising:
   obtaining a plurality of search results from a content store in response to a search query received from a computer user, wherein each of the obtained search results is associated with a score;
   identifying a plurality of user intents from the obtained search results;
   grouping the obtained search results into a plurality of groups of search results, each of the plurality of groups corresponding to one of the identified plurality of user intents;
   selecting a first user intent from the plurality of user intents, wherein the first user intent is selected according to the group of search results of the plurality of groups having the highest scoring search results;
   generating one or more search results pages including a first search results page, wherein the first search results page is generated from the group of search results corresponding to the selected first user intent, and wherein each search results page is generated such that each search results page includes search results of a single user intent of the plurality of user intents; and
   providing at least the first search results page to the computer user in response to the search query.

2. The computer-implemented method of claim 1, wherein the score associated with each search results is determined according to at least one of user context information, explicit user profile information, user preferences, and relevance of the search result to the search query.

3. The computer-implemented method of claim 1 further comprising expanding the search query received from the computer user, and wherein obtaining search results responsive to the search query comprises obtaining search results for the expanded search query.

4. The computer-implemented method of claim 1 further comprising:
   selecting a second user intent from the plurality of user intents, the second user intent being a different user intent than the first user intent;
   determining an intent-specific search query for the group of search results corresponding to second user intent; and
   including the intent-specific search query as a related search query in the generated search results page.

5. The computer-implemented method of claim 4, wherein generating the search results page comprises generating the search results page from the group of search results corresponding to the selected first user intent and including a subset of search results from the group of search results corresponding to the second user intent in a less prominent position on the search results page, one or more related search links corresponding to the first user intent, and one or more related search links corresponding to the second user intent.

6. The computer-implemented method of claim 5, wherein the subset of search results from the group of search results corresponding to the second user intent are included below a fold of the generated search results page, wherein the fold indicates a location on the generated search results page such that above the fold, a subset of search results from the group of search results corresponding to the first user intent are initially visible and below the fold, the subset of search results from the group of search results corresponding to the second user intent are not initially visible on displaying the generated search results page.

7. The computer-implemented method of claim 1 further comprising:
   determining a plurality of intent-specific search queries for each of the plurality of groups of search results excluding the group of search results corresponding to the first user intent; and
   including a subset of the plurality of intent-specific search queries as a set of related search queries in the generated search results page.

8. A computer-readable medium bearing computer-executable instructions which, when executed on a computing system comprising at least a processor, carry out a method for responding to a search query from a user, the method comprising:
   obtaining a plurality of search results from a content store in response to a search query received from a computer user, wherein each of the obtained search results is associated with a score;
   identifying a plurality of user intents according to the obtained search results;
   grouping the obtained search results into a plurality of groups, each of the plurality of groups corresponding to one of the identified plurality of user intents;
   selecting a first user intent from the plurality of user intents based on the search query, wherein the first user intent is selected according to the group of search results of the plurality of groups having the highest scoring search results;
   generating one or more search results pages from the group of search results corresponding to the selected first user intent in response to the received search query from the computer user, wherein each search results page is generated such that the groups of search results are aligned with search results pages such that each generated search results page comprises only search results of a single user intent; and
   providing the generated search results page to the computer user in response to the search query.

9. The computer-readable medium of claim 8, wherein the method further comprises expanding the search query received from the computer user, and wherein obtaining search results responsive to the search query comprises obtaining search results for the expanded search query.

10. The computer-readable medium of claim 9, wherein the score associated with each search results is determined according to at least one of user context information, explicit user profile information, user preferences, and relevance of the search result to the search query.

11. The computer-readable medium of claim 9, wherein the method further comprises:
    selecting a second user intent from the plurality of user intents, the second user intent being a different user intent that the first user intent;
    determining an intent-specific search query for the group of search results corresponding to second user intent; and
    including the intent-specific search query as a related search query in the generated search results page with one or more related search queries corresponding to the first user intent, wherein the related search query corresponding to the second user intent is included in a less prominent position on the search results page as comparison to the one or more related search queries corresponding to the first user intent.

12. The computer-readable medium of claim 8, wherein generating the search results page comprises generating the search results page from the group of search results corresponding to the selected first user intent and also including a subset of search results from the group of search results corresponding to the second user intent in a less prominent position on the search results page.

13. The computer-readable medium of claim 12, wherein the subset of search results from the group of search results corresponding to the second user intent and a subset of search results from the group of search results corresponding to the first user intent are included below the fold of the generated search results page.

14. The computer-readable medium of claim 12, wherein the method further comprises:
    determining a plurality of intent-specific search queries for each of the plurality of groups of search results excluding the group of search results corresponding to the first user intent; and
    including a subset of the plurality of intent-specific search queries as a set of related search queries in the generated search results page.

15. The computer-readable medium of claim 8, wherein each group of the search results is presented on the search results page as a tabbed view of search results.

16. A computer system for providing online search services, the system comprising a processor and a memory, wherein the processor executes instructions stored in the memory as part of or in conjunction with additional components to respond to a search query from a computer user, the additional components comprising:
    a communication component by which the computer system receives the search query from the computer user and returns a generated search results page to the computer user over a network;
    a search results retrieval component that obtains a plurality of search results from a content store in response to the computer system receiving the search query from the computer user, wherein each of the obtained search results are associated with a score;
    an intent identification component that identifies a plurality of user intents from the search results obtained by the search results retrieval component responsive to the computer system receiving the search query from the computer user;
    a search results grouping component that groups the search results obtained by obtained by the search results retrieval component into a plurality of groups of search results, each of the plurality of groups corresponding to one of the identified plurality of user intents; and an intent selection component that selects a first user intent from the plurality of user intents as the primary intent of the search query based on the search query, wherein the intent selection component selects the first user intent from the plurality of user intents according to the group of search results having the highest scoring search results;

a search results page generator that generates one or more search results pages in response to receiving the search query from the group of search results corresponding to the selected first user intent, wherein the search results page generator generates the one or more search results pages such that the groups of search results are aligned with search results pages such that each search results page is targeted to single user intent.

17. The computer system of claim 16, wherein each of the obtained search results are associated with a score, and wherein selecting a first user intent from the plurality of user intents comprises selecting the first user intent corresponding to the group of search results having the highest scoring search results.

18. The computer system of claim 17 further comprising: an intent-specific search query component that determines an intent-specific search query for each of the plurality of groups of search results excluding the group of search results corresponding to the first user intent; and wherein the search results page generator includes a plurality of intent-specific search queries as a set of related search queries in the generated search results page.

19. The computer system of claim 16, wherein each group of the search results is presented on the search results page as a tabbed view of search results.

* * * * *